(12) United States Patent
Li

(10) Patent No.: US 11,283,768 B1
(45) Date of Patent: Mar. 22, 2022

(54) SYSTEMS AND METHODS FOR MANAGING CONNECTIONS

(71) Applicant: NORTONLIFELOCK INC., Tempe, AZ (US)

(72) Inventor: Qing Li, Cupertino, CA (US)

(73) Assignee: NortonLifeLock Inc., Tempe, AZ (US)

( * ) Notice: Subject to any disclaimer, the term of this patent is extended or adjusted under 35 U.S.C. 154(b) by 0 days.

(21) Appl. No.: 17/190,213

(22) Filed: Mar. 2, 2021

(51) Int. Cl.
*H04L 12/26* (2006.01)
*H04L 29/06* (2006.01)

(52) U.S. Cl.
CPC ...... *H04L 63/0245* (2013.01); *H04L 63/0281* (2013.01); *H04L 63/0876* (2013.01); *H04L 63/20* (2013.01)

(58) Field of Classification Search
CPC ............. H04L 63/0245; H04L 63/0281; H04L 63/0876; H04L 63/20
See application file for complete search history.

(56) References Cited

U.S. PATENT DOCUMENTS

| 2014/0185482 A1* | 7/2014 | Jackowski | H04L 43/0894 370/252 |
| 2016/0094351 A1* | 3/2016 | Rune | H04L 12/1485 455/408 |
| 2018/0241727 A1* | 8/2018 | Verzun | H04L 9/34 |
| 2021/0092054 A1* | 3/2021 | Kondapavuluru | H04L 63/04 |

OTHER PUBLICATIONS

Information Sciences Institute, University of South California, "Transmission Control Protocol, Internet Standard RFC 793", Sep. 1981. (Year: 1981).*

* cited by examiner

*Primary Examiner* — Noura Zoubair
(74) *Attorney, Agent, or Firm* — FisherBroyles, LLP

(57) ABSTRACT

The disclosed computer-implemented method for managing connections may include (i) detecting, by a security agent on an endpoint, an attempt by another application on the endpoint to establish a connection according to a specific Internet protocol, and (ii) injecting, by the security agent on the endpoint, into an options field within a header of a network packet within the connection, the header formatted according to the specific Internet protocol, at least one byte that reveals identifying information about the application to enable an in-line proxy security device to manage the connection according to the revealed identifying information. Various other methods, systems, and computer-readable media are also disclosed.

20 Claims, 10 Drawing Sheets

SYSTEMS AND METHODS FOR MANAGING CONNECTIONS

BACKGROUND

Applications on enterprise computing networks frequently encrypt their network packet payloads for security and privacy purposes. The use of encryption prevents bad actors from discovering the underlying information within these network packets. At the same time, the use of encryption may also prevent good actors or security devices from fully understanding or managing network traffic. Moreover, even in scenarios where network traffic is not fully encrypted, it can nevertheless become inconvenient or cumbersome for security devices to correctly identify, categorize, and manage network traffic. The present disclosure, therefore, identifies and addresses a need for systems and methods for managing connections.

SUMMARY

As will be described in greater detail below, the present disclosure describes various systems and methods for managing connections. In one example, a computer-implemented method for managing connections may include detecting, by a security agent on an endpoint, an attempt by another application on the endpoint to establish a connection according to a specific Internet protocol and injecting, by the security agent on the endpoint, into an options field within a header of a network packet within the connection, the header formatted according to the specific Internet protocol, at least one byte that reveals identifying information about the application to enable an in-line proxy security device to manage the connection according to the revealed identifying information.

In one embodiment, a value set in the options field is unreserved according to the specific Internet protocol. In one embodiment, the options field being unreserved enables applications that are configured to read and process the value within the options field to do so while other applications ignore the value and allow the network packet to propagate normally. In one embodiment, the specific Internet protocol may include the Transmission Control Protocol. In one embodiment, the security agent is configured to use a same encoding scheme to encode the at least one byte that is used by the in-line proxy security device to enable the in-line proxy security device to decode the information. In one embodiment, the information fits within forty bytes.

In one embodiment, the options field may include at least two of an option-kind field, an option-length field, and an option-data field. In one embodiment, the option-kind field has a value set to an integer between 9 and 255. In one embodiment, the option-kind field has a value set to an integer that is categorized as encrypted applications management according to an encoding scheme that is shared between the security agent and the in-line proxy security device. In one embodiment, an option-data field within the options field specifies at least one byte that is categorized as a code for an identity of an application according to an encoding scheme that is shared between the security agent and the in-line proxy security device. In one embodiment, the option-data field within the options field specifies at least one byte that is categorized as a subcode for a type of functionality that is provided by the application according to an encoding scheme that is shared between the security agent and the in-line proxy security device. In one embodiment, the byte is an octet.

In one embodiment, a payload of the network packet is encrypted. In one embodiment, the network packet is delivered to a destination specified in the header without decrypting the payload. In some examples, omitting decryption eliminates a request for a transmitter of the network packet to authorize decrypting the payload. In some examples, enabling the in-line proxy security device to manage the connection according to the revealed identifying information eliminates a burden for the security agent to manage the connection on the endpoint. In some examples, injecting the byte into the options field within the header enables an in-line proxy security device to prioritize or accelerate transmission of the network packet based on revealing the identifying information about the application. In some examples, revealing the identifying information reveals that the network packet is directed to video network traffic.

In one embodiment, a system for implementing the above-described method may include (i) a detection module, stored in memory, that detects, as part of a security agent on an endpoint, an attempt by another application on the endpoint to establish a connection according to a specific Internet protocol, (ii) an injection module, stored in memory, that injects, as part of the security agent on the endpoint, into an options field within a header of a network packet within the connection, the header formatted according to the specific Internet protocol, at least one byte that reveals identifying information about the application to enable an in-line proxy security device to manage the connection according to the revealed identifying information, and (iii) at least one physical processor configured to execute the detection module and the injection module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to detect, through a security agent on an endpoint, an attempt by another application on the endpoint to establish a connection according to a specific Internet protocol and inject, through the security agent on the endpoint, into an options field within a header of a network packet within the connection, the header formatted according to the specific Internet protocol, at least one byte that reveals identifying information about the application to enable an in-line proxy security device to manage the connection according to the revealed identifying information.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
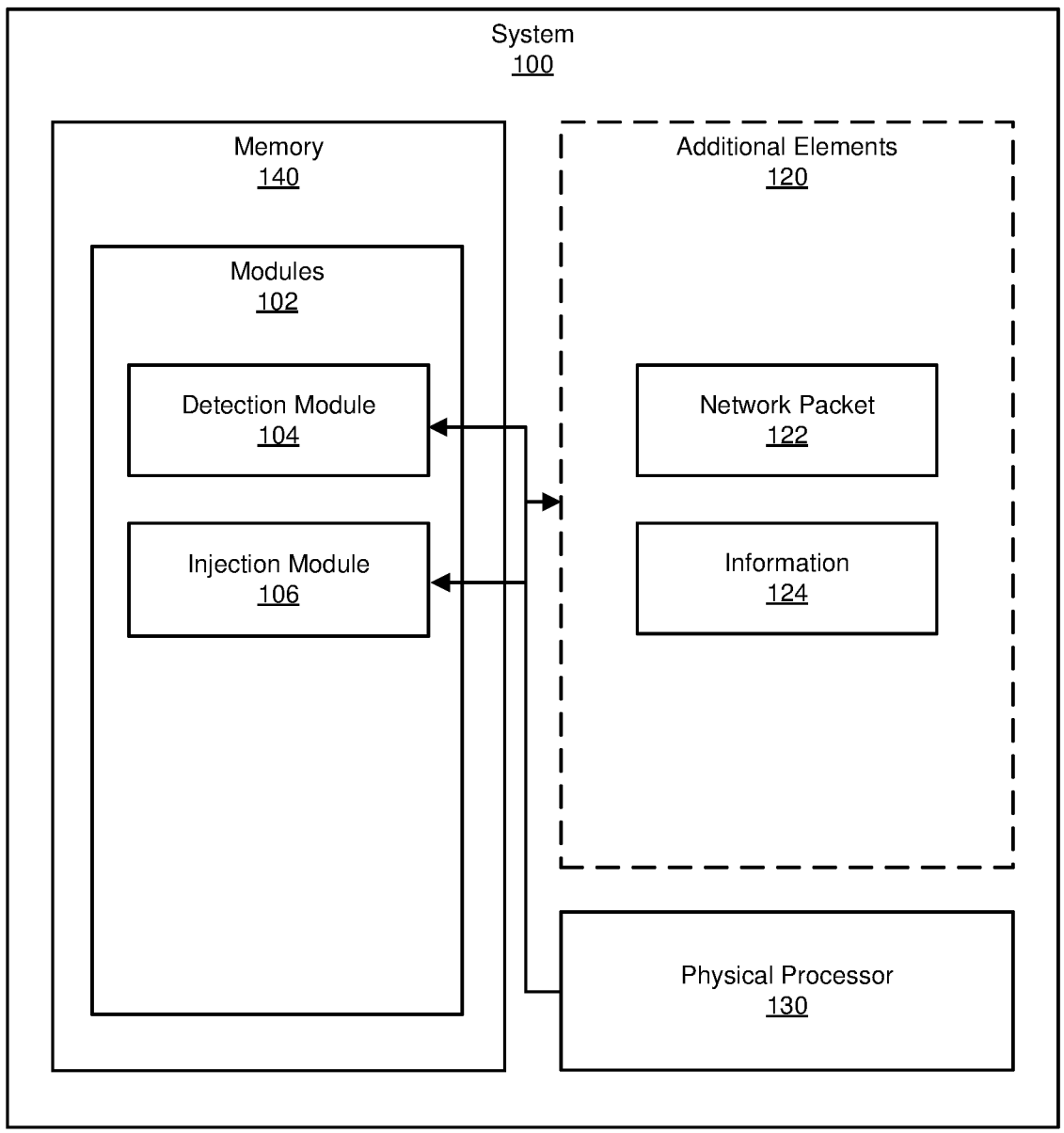
FIG. 1 is a block diagram of an example system for managing connections.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for managing connections. The disclosed technology may improve upon related systems that manage network connections. For example, the disclosed technology may overcome problems associated with client-side network management, due to the efficiencies that are gained by disposing network management functionality within an in-line proxy device for an entire network rather than at a client device that might access a variety of different networks with different respective security policies. Similarly, the disclosed technology may overcome problems associated with managing encrypted network traffic. Related systems may attempt to manage encrypted network traffic by decrypting the network traffic and then using the decrypted payload information in a benign or helpful manner. Nevertheless, decrypting network traffic for beneficial purposes may still involve requesting client authorization to decrypt network traffic, may still involve significant storage burdens to store and protect the decrypted data, and may still create certain liabilities due to the decryption. Moreover, although unencrypted network traffic may not necessarily have all of these problems that the present technology solves, the technology disclosed herein may further provide benefits for unencrypted network traffic, as discussed in more detail below.

Figure 2:
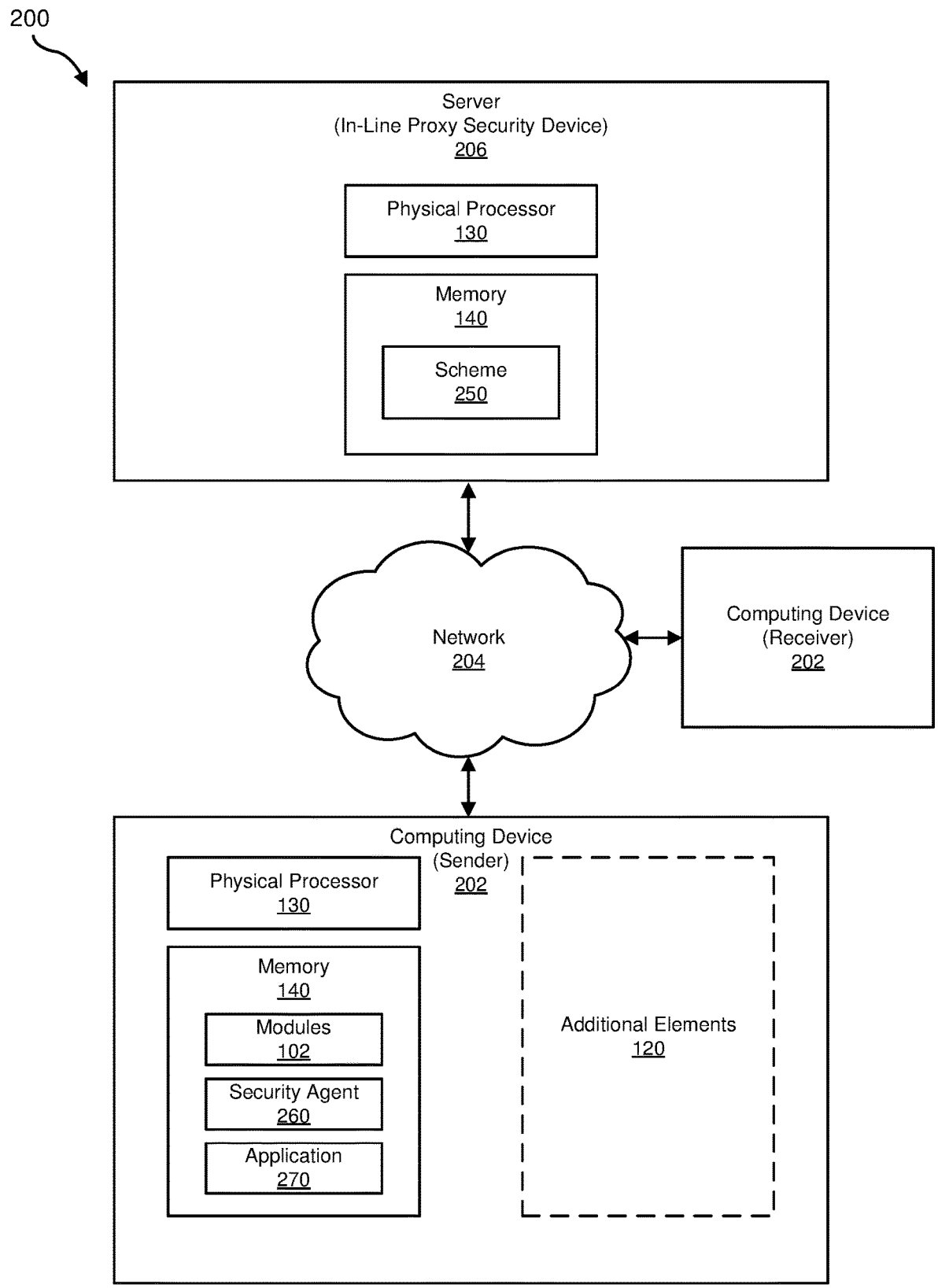
FIG. 2 is a block diagram of an additional example system for managing connections.

The following will provide, with reference to FIGS. 1-2, detailed descriptions of example systems for managing connections. Detailed descriptions of corresponding computer-implemented methods will also be provided in connection with FIGS. 3-8. In addition, detailed descriptions of an example computing system and network architecture capable of implementing one or more of the embodiments described herein will be provided in connection with FIGS. 9 and 10, respectively.

FIG. 1 is a block diagram of example system 100 for managing connections. As illustrated in this figure, example system 100 may include one or more modules 102 for performing one or more tasks. For example, and as will be explained in greater detail below, example system 100 may include a detection module 104 that detects, as part of a security agent on an endpoint, an attempt by another application on the endpoint to establish a connection according to a specific Internet protocol. Example system 100 may additionally include an injection module 106 that injects, as part of the security agent on the endpoint, into an options field within a header of a network packet 122 within the connection, the header formatted according to the specific Internet protocol, at least one byte that reveals identifying information 124 about the application to enable an in-line proxy security device to manage the connection according to information 124. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate managing connections. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system.

For example, and as will be described in greater detail below, detection module 104 may detect, as part of a security agent 260 on an endpoint, which may correspond to an instance of computing device 202 (which is labeled as the sender computer), an attempt by another application 270 on the endpoint to establish a connection according to a specific Internet protocol. Injection module 106 may inject, as part of the security agent on the endpoint, into an options field within a header of a network packet 122 within the connection, the header formatted according to the specific Internet protocol, at least one byte that reveals information 124 about the application to enable an in-line proxy security device, which may correspond to a server 206, to manage the connection according to information 124. FIG. 2 also illustrates how another instance of computing device 202, which is labeled as the receiver computer, will serve as the destination for network packet 122 after the sender computer has injected the information into the header and server 206 has managed the network packet appropriately (e.g., by accelerating its transmission), as discussed in further detail below.

Computing device 202 generally represents any type or form of computing device capable of reading computer-executable instructions. An illustrative example of computing device 202 may include an endpoint user or employee computing device such as a desktop, laptop, tablet, or smartphone. Additional examples of computing device 202 include, without limitation, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Figure 3:
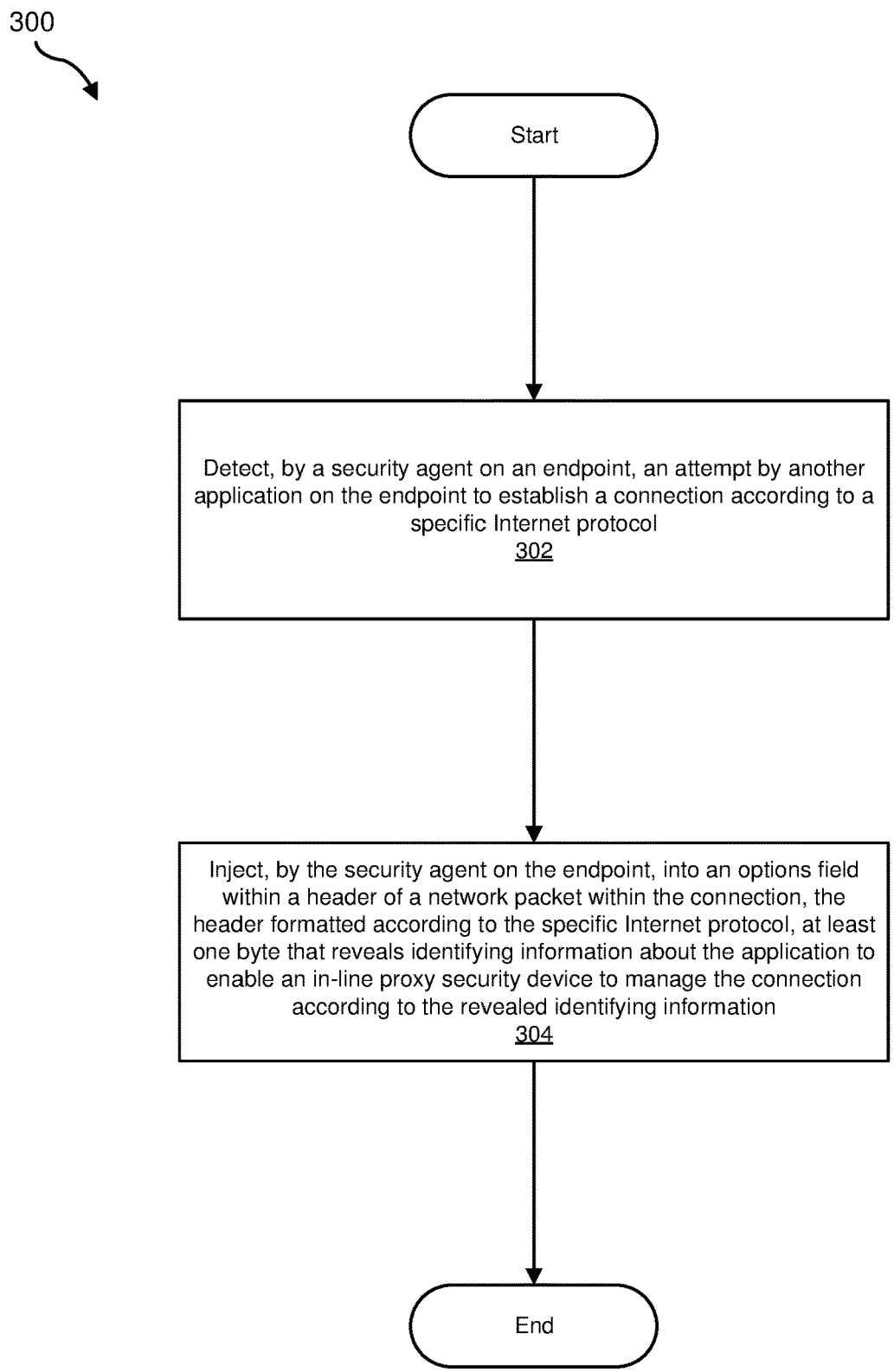
FIG. 3 is a flow diagram of an example method for managing connections.

Server 206 generally represents any type or form of computing device that is capable of facilitating the performance of method 300 of FIG. 3. Generally speaking, server 206 may correspond to a proxy server that manages network traffic as an intermediary between a sender node and a destination node. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

FIG. 3 is a flow diagram of an example computer-implemented method 300 for managing connections. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may detect, by a security agent on an endpoint, an attempt by another application on the endpoint to establish a connection according to a specific Internet protocol. For example, detection module 104 may detect, as part of security agent 260 on computing device 202, an attempt by application 270 on the sender computer to establish a connection according to a specific Internet protocol.

Detection module 104 may perform step 302 in a variety of ways. Generally speaking, detection module 104 may detect that an application is attempting to establish a network connection, such as a remote network connection or Internet connection. Detection module 104 may detect the attempt by monitoring traffic through a local network card, for example, or by monitoring operating system interactions with the applications.

The application may include any suitable application for network traffic management. Illustrative examples of such applications may include personal and business applications, social networking applications, video aggregating websites, online banking websites, etc. In contrast, the security agent may correspond to a logically independent application or process executing on the sending computer endpoint, which nevertheless provides additional functionality for managing network connections, in addition to the functionality of the application that generated the original network packet. For example, the application may correspond to a social networking application like FACEBOOK and the security agent may correspond to an endpoint security solution like NORTON MOBILE. These two applications may have different owners, and otherwise be unrelated, despite the fact that the security agent may be configured to modify network traffic that is generated by the original application in accordance with method 300, as discussed in more detail below.

In general, detection module 104 may detect the attempt to establish the network connection by monitoring for network handshake or connection attempts at a particular layer of the network model. An illustrative example of such a model may include the Open Systems Interconnection or OSI model. The specific Internet protocol of step 302 may establish a network connection at that particular layer. In one embodiment, the specific Internet protocol may include the Transmission Control Protocol or TCP. In the Open Systems Interconnection model, the TCP handshake and connection may operate at the transport layer 4 or the session layer 5, for example. The Transmission Control Protocol also corresponds to its own network model TCP/IP, which may be used in the alternative. In the case of the TCP/IP model, TCP connections may operate at the Host-to-Host or Transport layer. In either case of the OSI or TCP/IP model, the general functioning of the TCP network connection in relation to method 300 is essentially the same.

Figure 4:
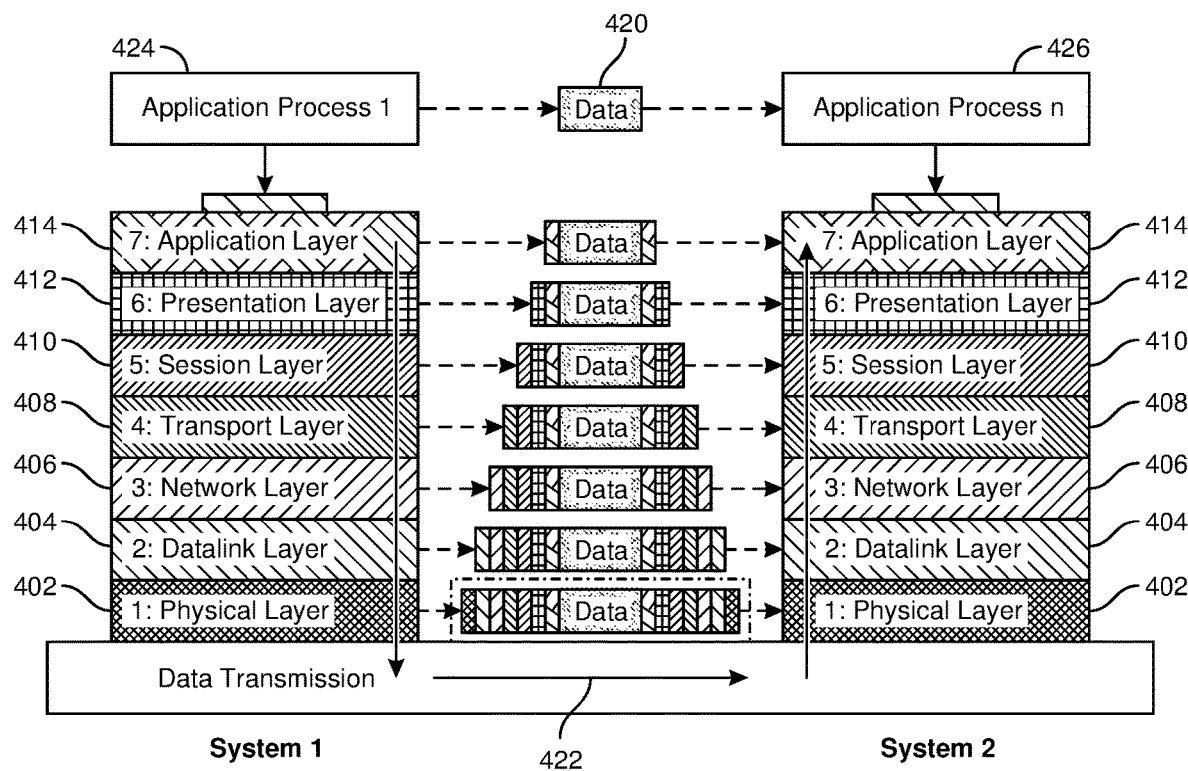
FIG. 4 is a diagram of an example workflow for network packet encapsulation.

FIG. 4 provides an illustrative workflow of general network packet encapsulation procedures according to the example of the OSI model. An application 424, which may correspond to application 270, may generate and attempt to transmit data 420 to a receiving application 426 across a network, such as network 204. Data 420 may be increasingly padded with data or headers at each of seven different layers of the network model. These may include the application layer 414, the presentation layer 412, the session layer 410, the transport layer 408, the network layer 406, the data link layer 404, and the physical layer 402. Data 420 may be transmitted in a direction 422, which is further illustrated in the figure. After the completion of adding all of this extra data and header information for network procedures, the extra data may be progressively removed in the reverse direction until the final payload of data 420 is presented to application 426. As further discussed above, a TCP header may operate at transport layer 408 and/or session layer 410. Thus, at this point in the sequence of progressively adding headers and metadata to the network packet, a header may be added according to the TCP protocol, and this header may provide metadata information for guiding and navigating the network packet appropriately to its destination.

In one embodiment, a payload of the network packet is encrypted. Thus, in the example of FIG. 4, the original content of data 420 may be encrypted as a payload by application 424. Similarly, application 426 may optionally decrypt data 420 upon receipt. In this scenario, each of the applications and processes operating at the subsequent layers of the OSI model may provide additional header and metadata information, as further discussed above, but without having visibility into the actual content of data 420 due to the encryption. The performance of method 300 may be beneficial in the context of encrypted network communications, but method 300 may also be applicable and helpful in the context of unencrypted network communications, as discussed in more detail below.

At step 304, one or more of the systems described herein may inject, as part of the security agent on the endpoint, into an options field within a header of a network packet within the connection, the header formatted according to the specific Internet protocol, at least one byte that reveals identifying information about the application to enable an in-line proxy security device to manage the connection according to the revealed identifying information. For example, injection module 106 may inject, as part of security agent 260 on the sender computer, into an options field within a header of network packet 122 within the connection, the header formatted according to the specific Internet protocol, at least one byte that reveals identifying information about the application to enable an in-line proxy security device to manage the connection according to the revealed identifying information. As used herein, the term "identifying information" generally refers to any of the information injected into the header, as discussed in the context of FIG. 8, to thereby identify a corresponding application, type of application, or type of functionality provided by the application, etc., as discussed in more detail below.

As used herein, the term "options field" generally refers to a standard field of an Internet protocol header that is defined within the standard as optional such that information may optionally be placed within the field but, if no information is present in the field, the network packet will nevertheless be transmitted normally. Thus, the options field provides room for additional information that can expand or modify normal network operations or other application behavior. Moreover, as used herein, the phrase "the header formatted according to the specific Internet protocol" generally refers to the header satisfying a format or structure for that particular Internet protocol, rather than another header from a different protocol or layer of the OSI or TCP/IP model. In the example of the TCP protocol, the header would be a TCP header, rather than a header at the datalink layer or the presentation layer, for example.

Figure 5:
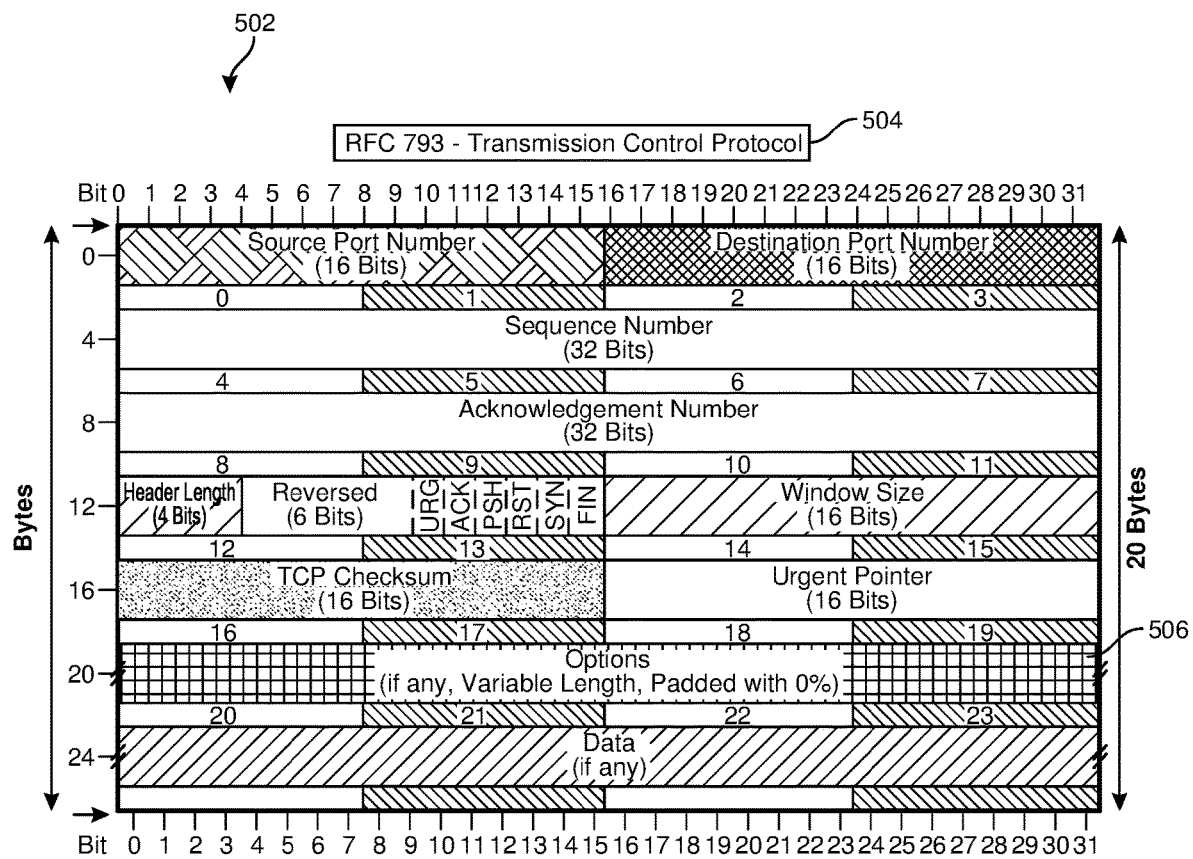
FIG. 5 is a diagram of an example network packet header.

Injection module 106 may perform step 304 in a variety of ways. Generally speaking, injection module 106 may perform step 304 by leveraging the options field of the TCP header. This is a header added during the network packet encapsulation procedures that were discussed above in more detail in connection with FIG. 4. Further to that discussion, FIG. 5 shows an illustrative example of the formatting or structure of such a standard TCP header 502. As further shown in this figure, a header 504 may specify that this header is formatted according to the industry standard of RFC 793, which refers to the Transmission Control Protocol. This figure also illustrates how the standard network packet header may include a number of different fields from top to bottom. These include the source port number, the destination port number, the sequence number, the acknowledgment number, the header length, reserved bits, the window size, the TCP checksum, the urgent pointer, and an options field 506. These fields may generally form the standard TCP network packet header. After these fields may follow data, which is shown at the bottom of the header in FIG. 5, and which may correspond to data 420 of FIG. 4 (in addition to any extra information provided at OSI layers 6 and 7, for example). Although not directly shown in FIG. 5, the TCP standard may specify a maximum size of 40 bytes or 320 bits for options field 506.

In some examples, method 300 may leverage more specifically the options field 506 of the TCP protocol, as discussed above, rather than a different field of the network packet header, and rather than at a different layer of the OSI or TCP/IP model. The options field of the TCP header may be optional, as discussed above, and provides space for additional information which can be used for network management purposes or other extended functionality.

In one embodiment, a value set in the options field is unreserved according to the specific Internet protocol. As used herein, the term "unreserved" generally refers to the official standard for the specific Internet protocol not specifying that specific value as having any predefined meaning or indicated functionality, in contrast to one or more other values, which may be reserved and defined according to the official standard. Thus, in one embodiment, the value within the options field being unreserved enables applications that are configured to read and process the value within the options field to do so while other applications ignore the value and allow the network packet to propagate normally. In particular, a corresponding security application at server 206 may be configured to read and process the value within the options field, in accordance with method 300, for network management purposes, even while other applications ignore the value and therefore ignore the corresponding options data.

Figure 6:
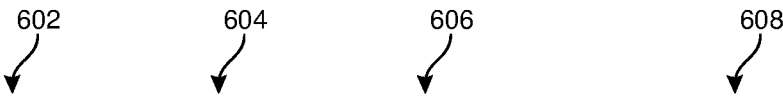
FIG. 6 is a table indicating reserved values for the option-kind field within a network packet header.

To further illustrate the meaning of reserved values within the options field, FIG. 6 shows a table that further highlights the structure of options field 506 in FIG. 5. The first three columns of this table correspond to the three sub-fields within the options field 506: an option-kind field at a column 602, an option-length field at a column 604, and an option-data field at a column 606. For explanatory purposes, this table also includes a column 608, which further provides a helpful description of the purpose of the corresponding option-kind, although the content of column 608 would not actually be included within options field 506. Thus, to specify an option within the options field, the TCP standard indicates that the option should specify the option-kind (what type of option is it), the option-length (how long is this specific option), and the option-data (what is the actual and underlying data or payload for this specific option).

Generally speaking, the type of an option is specified by the option-kind code in column 602. The table of FIG. 6 shows seven illustrative examples of types of options that are reserved according to the TCP protocol standard. For illustrative purposes, the option-kind of 0 specifies the end of options list, and the option-kind of 8 specifies a timestamp and an echo of a previous timestamp.

In contrast, the remaining values greater than eight and up to 255 may be unreserved. Accordingly, applications are free to set the value within column 602 to any value between 9 and 255, for example. Thus, in the context of method 300, injection module 106 may leverage a value between 9 and 255 to indicate network management procedures, as discussed further below.

Figure 7:
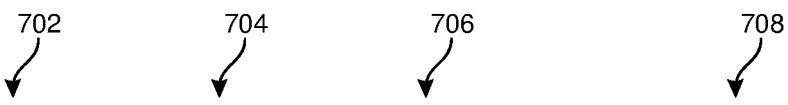
FIG. 7 is an example table for an encoding scheme for encoding identifying data within a network packet header.

In one embodiment, the security agent is configured to use a same encoding scheme to encode the at least one byte that is used by the in-line proxy security device to enable the in-line proxy security device to decode the information. FIG. 7 shows an illustrative example of such a shared encoding scheme. For example, the shared encoding scheme may correspond to a table that includes a column 702, a column 704, a column 706, and a column 708. Column 702 may specify a program name or identifier. The strings that form such names may be too big to fit conveniently within the options field, and so column 704 may translate each program name into a corresponding code, which may include a two digit code, as shown in this figure. The use of an encoding scheme also provides a weak form of encryption that prevents other applications, which do not possess the shared scheme of FIG. 7, from conveniently parsing the corresponding options field. Rather, such outside applications may simply ignore the information, as further discussed above.

Similarly, a column 706 may specify a command code that distinguish between multiple different functionalities or features provided by corresponding applications. In the illustrative example of this figure, the program SuperChat may provide both texting functionality and video conferencing functionality. To distinguish between these two, the command code at column 706 may specify a subcode, such as a single digit number, which distinguishes between these two different types of functionality or network communications. Column 708 merely shows how additional and unspecified data may also be encoded according to the shared scheme.

In one embodiment, the option-kind field has a value set to an integer that is categorized as encrypted applications management according to an encoding scheme that is shared between the security agent and the in-line proxy security device. Thus, returning to FIG. 6, an unreserved value between 8 and 255 may be predefined, according to the shared scheme of FIG. 7, to specify encrypted applications management. An illustrative and arbitrary example of such a number may be 79. Of course, as further discussed above, method 300 may also be performed for beneficial purposes with respect to unencrypted applications management as well.

Figure 8:
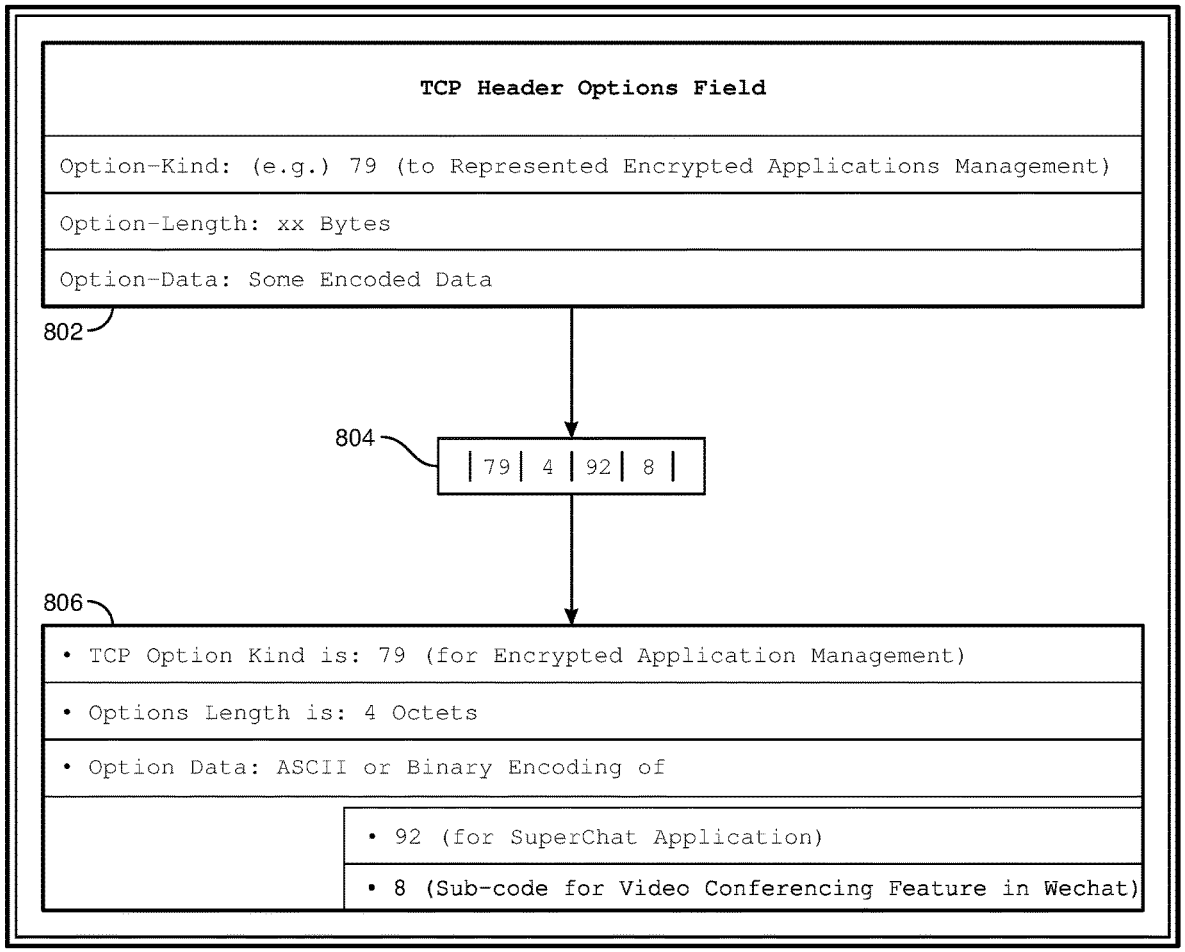
FIG. 8 is a diagram illustrating details of how to encode data within an options field of a header of a network packet.

FIG. 8 provides a more comprehensive and detailed set of tables (i.e., a table 802, a table 804, and a table 806) that illustrate the configuration of an options field, within options field 506, according to method 300. As discussed above, the TCP standard may require an option field to be formatted with value set in the subfields of an option-kind, option-length, and option-data. In this example, the value of 79 may be set within the option-kind subfield. This arbitrary value between 8 and 255 may be predefined, according to the shared scheme, as indicating encrypted applications management. Accordingly, whenever security agent 260 and/or server 206, see this specific value within the option-kind subfield, these applications may understand that they are encountering encoded information according to method 300.

In further embodiments, an option-data field within the options field specifies at least one byte that is categorized as a code for an identity of an application according to an encoding scheme that is shared between the security agent and the in-line proxy security device. In the illustrative example of FIG. 8, the number 92 is set as a value within the option-data subfield, which is the code for the SuperChat application according to the table of FIG. 7.

In even further examples, the option-data field within the options field specifies at least one byte that is categorized as a subcode for a type of functionality that is provided by the application according to an encoding scheme that is shared between the security agent and the in-line proxy security device. Returning to the example of FIG. 8, table 804 and table 806 further illustrate how the sub-code of 8 may be included at the end of the option-data subfield, thereby specifying video conferencing according to the table of the shared scheme shown in FIG. 7.

The performance of method 300 has a variety of potential benefits. In one embodiment, the network packet is delivered to a destination specified in the header without decrypting the payload. Thus, the network management procedures of method 300 may successfully avoid the inconveniences and legal liability associated with decrypting the payload of the network packet. These inconveniences may include requesting authorization from the sender of the network packet, providing storage and protection for the decrypted data, and certain legal liabilities associated with decrypting user data.

In some examples, enabling the in-line proxy security device to manage the connection according to the revealed identifying information eliminates a burden for the security agent to manage the connection on the endpoint. For example, a user may leverage an endpoint computing device, such as a smartphone or tablet, for both personal and business uses. On the corporate campus, the user may connect to the corporate enterprise network, and when the user is home, the user may connect to a home personal network. The corporate enterprise network and the home personal network may have dramatically different security and network management policies. For these reasons, it is not convenient or practical to provide a single unified network management policy on the security agent or the endpoint device itself. Instead, there are benefits to embedding the network management policies, and the application of those policies, within server 206, which functions as an in-line proxy security device. Thus, the use of the in-line proxy security device within the corporate enterprise network, for example, ensures that corresponding policies are accurately applied on that same network, without the inconveniences associated with managing or configuring the endpoint device itself (i.e., other than installing the security agent for performing method 300).

As another example of the benefits of method 300, injection module 106 may inject the byte into the options field within the header to enable an in-line proxy security device to prioritize or accelerate transmission of the network packet based on revealing the identifying information about the application. For example, the information may reveal that the network packet is directed to videoconferencing, as discussed above in connection with FIG. 8. In that case, server 206 may optionally choose to accelerate the transmission or propagation of the network packet, due to the fact that acceptable performance for videoconferencing may require especially high bandwidth or network speeds in comparison to other types of network traffic.

Generally speaking, the performance of method 300 may provide the benefit of allowing server 206 to manage network connections based on information that it would otherwise not possess. In the case of encrypted network communications, the performance of method 300 and the injecting of metadata into the options field, may effectively conveying some aspect of identifying information that had been directly or indirectly prevented from being revealed while encrypted. In the scenario where the payload of the network packet is fully encrypted, server 206 may not readily know or ascertain the type of network connection, the purpose of the network connection, the identity or type of the application generating the network packet, or the functionality (such as chatting or videoconferencing) with which the network packet is associated. Because the security agent on the endpoint computing device is monitoring activities on that device and detecting when a specific application is generating the network packet, the security agent has the ability to inject such information into the options field, as discussed above, thereby conveying some identifying information that was directly or indirectly obscured through encryption. Similarly, even in the case of unencrypted traffic, this traffic may be readily formatted for convenient parsing by a corresponding application on the destination computer to which the network packet is directed, but may not be readily parsed by a third-party and independent security application at server 206. In other words, it is not practical for server 206 to have a comprehensive understanding of the formatting and structure of network packet payloads for all relevant applications communicating on the network. Accordingly, the security agent on the endpoint can monitor the applications that are actually present on the endpoint and then perform method 300 accordingly, thereby providing information for server 206 that can readily parse and understand the type and purpose of the corresponding network connection.

Figure 9:
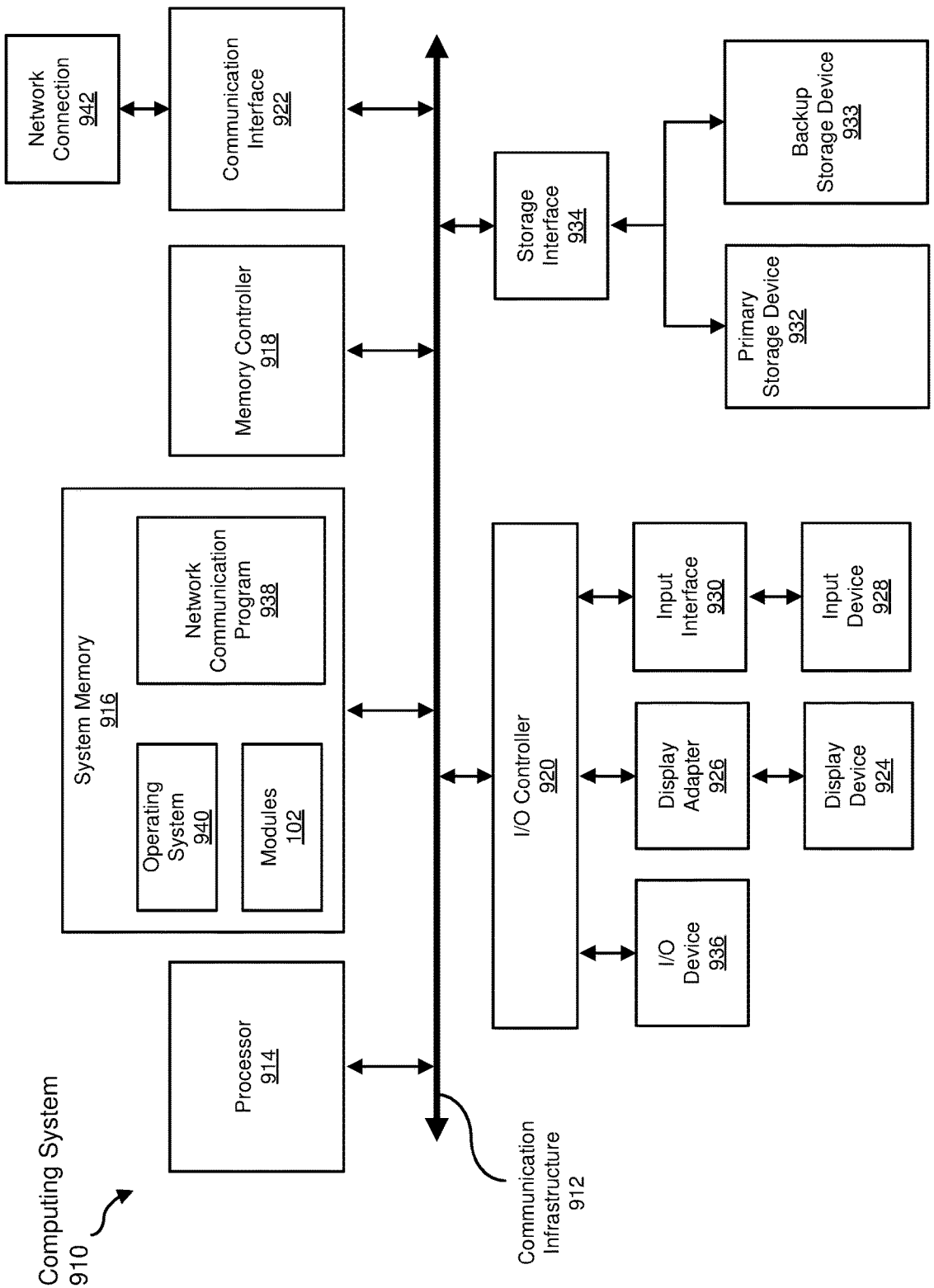
FIG. 9 is a block diagram of an example computing system capable of implementing one or more of the embodiments described and/or illustrated herein.

FIG. 9 is a block diagram of an example computing system 910 capable of implementing one or more of the embodiments described and/or illustrated herein. For example, all or a portion of computing system 910 may perform and/or be a means for performing, either alone or in combination with other elements, one or more of the steps described herein (such as one or more of the steps illustrated in FIG. 3). All or a portion of computing system 910 may also perform and/or be a means for performing any other steps, methods, or processes described and/or illustrated herein.

Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may include at least one processor 914 and a system memory 916.

Processor 914 generally represents any type or form of physical processing unit (e.g., a hardware-implemented central processing unit) capable of processing data or interpreting and executing instructions. In certain embodiments, processor 914 may receive instructions from a software application or module. These instructions may cause processor 914 to perform the functions of one or more of the example embodiments described and/or illustrated herein.

System memory 916 generally represents any type or form of volatile or non-volatile storage device or medium capable of storing data and/or other computer-readable instructions. Examples of system memory 916 include, without limitation, Random Access Memory (RAM), Read Only Memory (ROM), flash memory, or any other suitable memory device. Although not required, in certain embodiments computing system 910 may include both a volatile memory unit (such as, for example, system memory 916) and a non-volatile storage device (such as, for example, primary storage device 932, as described in detail below). In one example, one or more of modules 102 from FIG. 1 may be loaded into system memory 916.

In some examples, system memory 916 may store and/or load an operating system 940 for execution by processor 914. In one example, operating system 940 may include and/or represent software that manages computer hardware and software resources and/or provides common services to computer programs and/or applications on computing system 910. Examples of operating system 940 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 910 may also include one or more components or elements in addition to processor 914 and system memory 916. For example, as illustrated in FIG. 9, computing system 910 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an Industry Standard Architecture (ISA), Peripheral Component Interconnect (PCI), PCI Express (PCIe), or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934.

As illustrated in FIG. 9, computing system 910 may also include at least one display device 924 coupled to I/O controller 920 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, example computing system 910 may also include at least one input device 928 coupled to I/O controller 920 via an input interface 930. Input device 928 generally represents any type or form of input device capable of providing input, either computer or human generated, to example computing system 910. Examples of input device 928 include, without limitation, a keyboard, a pointing device, a speech recognition device, variations or combinations of one or more of the same, and/or any other input device.

Additionally or alternatively, example computing system 910 may include additional I/O devices. For example, example computing system 910 may include I/O device 936. In this example, I/O device 936 may include and/or represent a user interface that facilitates human interaction with computing system 910. Examples of I/O device 936 include, without limitation, a computer mouse, a keyboard, a monitor, a printer, a modem, a camera, a scanner, a microphone, a touchscreen device, variations or combinations of one or more of the same, and/or any other I/O device.

Communication interface 922 broadly represents any type or form of communication device or adapter capable of facilitating communication between example computing system 910 and one or more additional devices. For example, in certain embodiments communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution.

In some examples, system memory 916 may store and/or load a network communication program 938 for execution by processor 914. In one example, network communication program 938 may include and/or represent software that enables computing system 910 to establish a network connection 942 with another computing system (not illustrated in FIG. 9) and/or communicate with the other computing system by way of communication interface 922. In this example, network communication program 938 may direct the flow of outgoing traffic that is sent to the other computing system via network connection 942. Additionally or alternatively, network communication program 938 may direct the processing of incoming traffic that is received from the other computing system via network connection 942 in connection with processor 914.

Although not illustrated in this way in FIG. 9, network communication program 938 may alternatively be stored and/or loaded in communication interface 922. For example, network communication program 938 may include and/or represent at least a portion of software and/or firmware that is executed by a processor and/or Application Specific Integrated Circuit (ASIC) incorporated in communication interface 922.

As illustrated in FIG. 9, example computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a solid state drive, a floppy disk drive, a magnetic tape drive, an optical disk drive, a flash drive, or the like. Storage interface 934 generally represents any type or form of interface or device for transferring data between storage devices 932 and 933 and other components of computing system 910.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 910 may be configured as an Application Specific Integrated Circuit (ASIC) adapted to implement one or more of the example embodiments disclosed herein.

Figure 10:
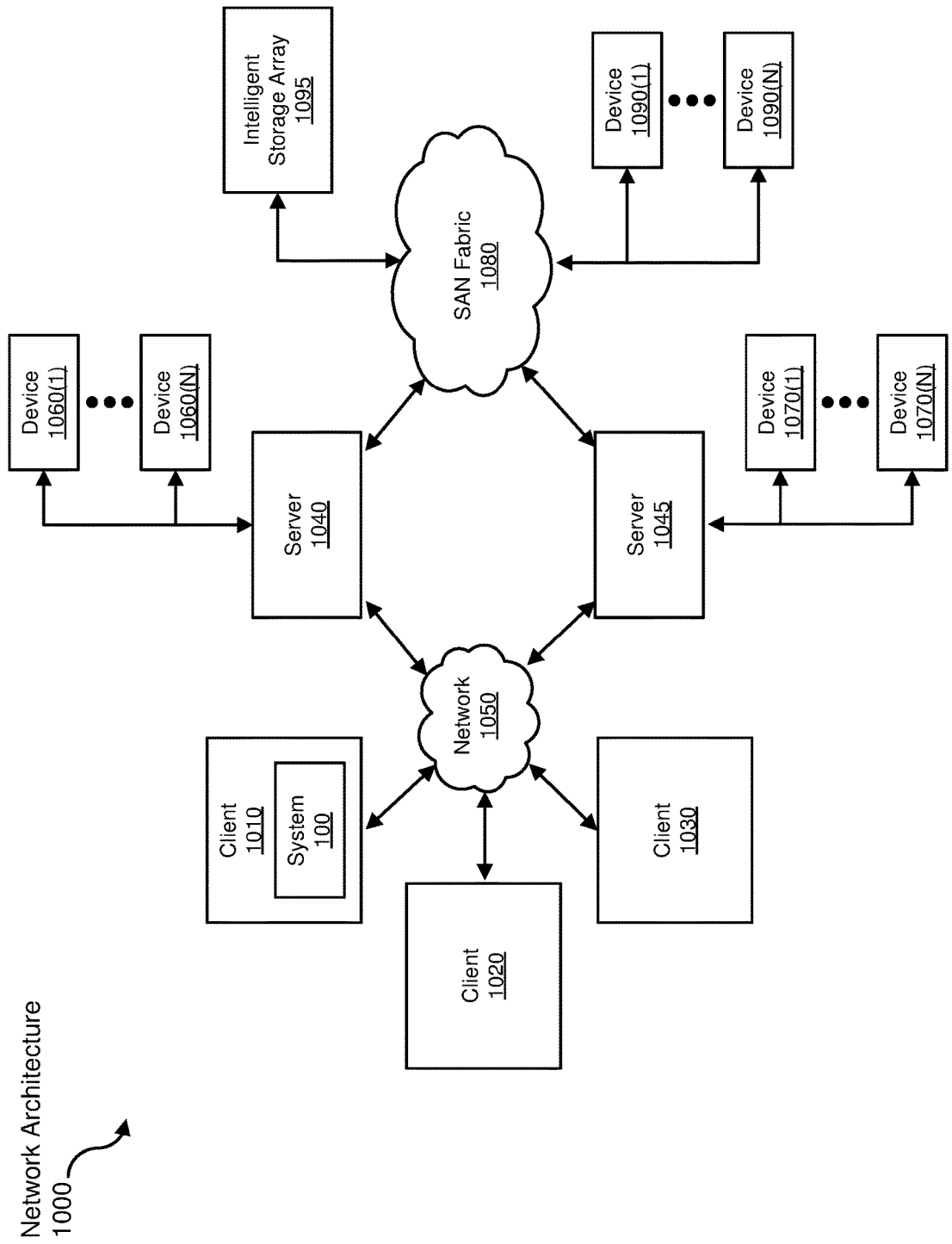
FIG. 10 is a block diagram of an example computing network capable of implementing one or more of the embodiments described and/or illustrated herein.

FIG. 10 is a block diagram of an example network architecture 1000 in which client systems 1010, 1020, and 1030 and servers 1040 and 1045 may be coupled to a network 1050. As detailed above, all or a portion of network architecture 1000 may perform and/or be a means for performing, either alone or in combination with other elements, one or more of the steps disclosed herein (such as one or more of the steps illustrated in FIG. 3). All or a portion of network architecture 1000 may also be used to perform and/or be a means for performing other steps and features set forth in the present disclosure.

Client systems 1010, 1020, and 1030 generally represent any type or form of computing device or system, such as example computing system 910 in FIG. 9. Similarly, servers 1040 and 1045 generally represent computing devices or systems, such as application servers or database servers, configured to provide various database services and/or run certain software applications. Network 1050 generally represents any telecommunication or computer network including, for example, an intranet, a WAN, a LAN, a PAN, or the Internet. In one example, client systems 1010, 1020, and/or 1030 and/or servers 1040 and/or 1045 may include all or a portion of system 100 from FIG. 1.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent Network-Attached Storage (NAS) devices configured to communicate with servers 1040 and 1045 using various protocols, such as Network File System (NFS), Server Message Block (SMB), or Common Internet File System (CIFS).

Servers 1040 and 1045 may also be connected to a Storage Area Network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to example computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the example embodiments disclosed herein may also be encoded as a computer program, stored in server 1040, run by server 1045, and distributed to client systems 1010, 1020, and 1030 over network 1050.

As detailed above, computing system 910 and/or one or more components of network architecture 1000 may perform and/or be a means for performing, either alone or in combination with other elements, one or more steps of an example method for managing connections.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing connections, at least a portion of the method being performed by a computing device comprising at least one processor, the method comprising:

detecting, by a security agent on an endpoint, an attempt by another application on the endpoint to establish a connection according to a specific Internet protocol; and injecting, by the security agent on the endpoint, into an options field within a header of a network packet within the connection, the header formatted according to the specific Internet protocol, at least one byte that reveals identifying information about the application to enable an in-line proxy security device to manage the connection according to the revealed identifying information;

wherein:

the specific Internet protocol comprises the Transmission Control Protocol;

the options field comprises an option-kind subfield, an option-length subfield, and an option-data subfield; and a value set in the option-kind subfield of the options field is unreserved according to the Transmission Control Protocol;

the unreserved value in the option-kind subfield is an integer between 9 and 254 that designates encrypted application management according to an encoding scheme that is shared between the security agent and the in-line proxy security device;

the option-data subfield includes a code that designates an identity of the application according to the encoding scheme;

the option-data subfield further includes a subcode that designates a type of functionality that is provided by the application according to the encoding scheme; and the encoding scheme maps codes to respective application identities.

2. The computer-implemented method of claim 1, wherein an encoding scheme that is shared between the security agent and the in-line proxy security device maps application identifiers to numerical codes.

3. The computer-implemented method of claim 1, the subcode designates texting functionality.

4. The computer-implemented method of claim 1, wherein the subcode designates video conferencing functionality.

5. The computer-implemented method of claim 1, wherein the security agent is configured to use a same encoding scheme to encode the at least one byte that is used by the in-line proxy security device to enable the in-line proxy security device to decode the information.

6. The computer-implemented method of claim 1, wherein the information fits within forty bytes.

7. The computer-implemented method of claim 4, wherein the subcode forms a single digit.

8. The computer-implemented method of claim 1, wherein the option-length subfield is four octets.

9. The computer-implemented method of claim 1, wherein the code forms two digits.

10. The computer-implemented method of claim 1, wherein the identity of the application corresponds to a social network application.

11. The computer-implemented method of claim 1, wherein the identity of the application corresponds to a texting application.

12. The computer-implemented method of claim 1, wherein the byte is an octet.

13. The computer-implemented method of claim 1, wherein a payload of the network packet is encrypted.

14. The computer-implemented method of claim 13, wherein the network packet is delivered to a destination specified in the header without decrypting the payload.

15. The computer-implemented method of claim 14, wherein omitting decryption eliminates a request for a transmitter of the network packet to authorize decrypting the payload.

16. The computer-implemented method of claim 1, wherein enabling the in-line proxy security device to manage the connection according to the revealed identifying information eliminates a burden for the security agent to manage the connection on the endpoint.

17. The computer-implemented method of claim 1, wherein injecting the byte into the options field within the header enables an in-line proxy security device to prioritize or accelerate transmission of the network packet based on revealing the identifying information about the application.

18. The computer-implemented method of claim 17, wherein revealing the identifying information reveals that the network packet is directed to video network traffic.

19. A system for managing connections, the system comprising:

a detection module, stored in memory, that detects, as part of a security agent on an endpoint, an attempt by another application on the endpoint to establish a connection according to a specific Internet protocol;

an injection module, stored in memory, that injects, as part of the security agent on the endpoint, into an options field within a header of a network packet within the connection, the header formatted according to the specific Internet protocol, at least one byte that reveals identifying information about the application to enable an in-line proxy security device to manage the connection according to the revealed identifying information; and at least one physical processor configured to execute the detection module, and the injection module;

wherein:

the specific Internet protocol comprises the Transmission Control Protocol;

the options field comprises an option-kind subfield, an option-length subfield, and an option-data subfield; and a value set in the option-kind subfield of the options field is unreserved according to the Transmission Control Protocol;

the unreserved value in the option-kind subfield is an integer between 9 and 254 that designates encrypted application management according to an encoding scheme that is shared between the security agent and the in-line proxy security device;

the option-data subfield includes a code that designates an identity of the application according to the encoding scheme;

the option-data subfield further includes a subcode that designates a type of functionality that is provided by the application according to the encoding scheme; and the encoding scheme maps codes to respective application identities.

20. A non-transitory computer-readable medium comprising one or more computer-readable instructions that, when executed by at least one processor of a computing device, cause the computing device to:

detect, through a security agent on an endpoint, an attempt by another application on the endpoint to establish a connection according to a specific Internet protocol; and inject, through the security agent on the endpoint, into an options field within a header of a network packet within the connection, the header formatted according to the specific Internet protocol, at least one byte that reveals identifying information about the application to enable an in-line proxy security device to manage the connection according to the revealed identifying information;

wherein:

the specific Internet protocol comprises the Transmission Control Protocol;

the options field comprises an option-kind subfield, an option-length subfield, and an option-data subfield; and a value set in the option-kind subfield of the options field is unreserved according to the Transmission Control Protocol;

the unreserved value in the option-kind subfield is an integer between 9 and 254 that designates encrypted application management according to an encoding scheme that is shared between the security agent and the in-line proxy security device;

the option-data subfield includes a code that designates an identity of the application according to the encoding scheme;

the option-data subfield further includes a subcode that designates a type of functionality that is provided by the application according to the encoding scheme; and the encoding scheme maps codes to respective application identities.

\* \* \* \* \*